US010611271B2

(12) United States Patent
Biberdorf et al.

(10) Patent No.: US 10,611,271 B2
(45) Date of Patent: Apr. 7, 2020

(54) OPERATOR STATION FOR MACHINES

(71) Applicant: Caterpillar Paving Products Inc., Brooklyn Park, MN (US)

(72) Inventors: Maria Lynn Biberdorf, Maple Grove, MN (US); Francisco Romero, Edina, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 33 days.

(21) Appl. No.: 16/004,660

(22) Filed: Jun. 11, 2018

(65) Prior Publication Data

US 2019/0375313 A1 Dec. 12, 2019

(51) Int. Cl.
| | |
|---|---|
| *B60N 2/06* | (2006.01) |
| *B60N 2/02* | (2006.01) |
| *B60N 2/38* | (2006.01) |
| *B62D 33/06* | (2006.01) |
| *B60N 2/14* | (2006.01) |

(52) U.S. Cl.
CPC ......... *B60N 2/0292* (2013.01); *B60N 2/0296* (2013.01); *B60N 2/38* (2013.01); *B62D 33/0617* (2013.01)

(58) Field of Classification Search
CPC .. B60N 2/0224; B60N 2/0228; B60N 2/0232; B60N 2/0244; B60N 2/0248; B60N 2/062; B60N 2/14; B60N 2/143; B60N 2/38; B60N 2/0292; B60N 2/0296
USPC ... 296/68, 65.06, 65.07, 65.11–65.13, 65.15, 296/65.18
See application file for complete search history.

(56) References Cited

U.S. PATENT DOCUMENTS

| | | | | |
|---|---|---|---|---|
| 4,802,706 | A * | 2/1989 | Onimaru | B60N 2/0224 296/68 |
| 4,812,838 | A * | 3/1989 | Tashiro | B60N 2/0232 180/326 |
| 6,024,398 | A | 2/2000 | Horton et al. | |
| 7,399,035 | B2 | 7/2008 | Kusanagi et al. | |
| 9,415,702 | B2 | 8/2016 | Auger | |
| 9,463,715 | B1 * | 10/2016 | Rawlinson | B60N 2/0248 |
| 10,259,347 | B2 * | 4/2019 | Kim | B60N 2/0232 |
| 2007/0284905 | A1 * | 12/2007 | Bailey | B60N 2/0232 296/65.07 |
| 2015/0015039 | A1 * | 1/2015 | Brand | B60N 2/14 297/257 |
| 2016/0332539 | A1 * | 11/2016 | Rawlinson | B60N 2/0244 |
| 2017/0362869 | A1 * | 12/2017 | Ghantous | B62D 33/0617 |
| 2018/0134180 | A1 * | 5/2018 | Ajisaka | B60N 2/0224 |

FOREIGN PATENT DOCUMENTS

JP S6390453 4/1988

* cited by examiner

*Primary Examiner* — Dennis H Pedder
(74) *Attorney, Agent, or Firm* — Oblon, McClelland, Maier & Neustadt (57) ABSTRACT

An operator station for a machine is disclosed. The operator station includes a first door, a second door, a seat, and a controller. The first door and the second door provide access to the operator station. The seat is disposed inside the operator station and is movable to a first position and to a second position. Further, the controller is configured to move the seat to the first position based on a first signal, and move the seat to the second position based on a second signal.

20 Claims, 7 Drawing Sheets

OPERATOR STATION FOR MACHINES

TECHNICAL FIELD

The present disclosure generally relates to an operator station for a machine. More particularly, the disclosure relates to an operator station having a seat that is movable to facilitate operator entry and seating within the operator station of the machine.

BACKGROUND

Machines, such as compactors, road reclaimers, excavators, loaders, etc., include operator stations or operator cabs that may house various controls for a myriad of functions of the machine. It is common for such operator stations to include a seat for seating an operator. It is also common for such operator stations to include multiple doors (e.g., two doors) that may allow operators to enter/exit the operator station. In some applications, the seat within the operator station may be mechanically movable towards each door, so as to allow an operator to exit by use of any door. However, after an exit, if a new operator, for example, were to enter the operator station through a different door, the new operator may find the seat to be in the improper orientation (i.e., in the direction towards the door that was used for exit by the earlier operator). In such a case, the new operator may have to climb and negotiate over various consoles and systems housed within the operator station, reach out to the seat, re-orient the seat, before being seated on the seat. This is a cumbersome process that is not just time consuming, but also causes operator discomfort. Moreover, in the process of climbing and negotiating over the various consoles and systems, it is possible for the new operator to inadvertently damage the consoles and/or the systems, in turn leading to possible repairs and machine downtime.

U.S. Pat. No. 4,802,706 relates to a rotary seat for a vehicle in which the seat is rotated so as to facilitate mounting and dismounting the vehicle. The rotary seat has a seat cushion member that is automatically rotated between a direction toward the front of the vehicle and a direction toward a side door of the vehicle.

SUMMARY OF THE INVENTION

In one aspect, the disclosure is directed towards an operator station for a machine. The operator station includes a first door, a second door, a seat, and a controller. The first door and the second door provides access to the operator station. The seat is disposed inside the operator station and is movable to a first position and to a second position. Further, the controller is configured to move the seat to the first position based on a first signal, and move the seat to the second position based on a second signal.

In another aspect, the disclosure relates to a machine. The machine includes a work implement and an operator station. The operator station includes a first door, a second door, a seat, and a controller. The operator station includes one or more controls configured to manipulate the work implement. The first door and the second provide access to the operator station. The seat is disposed inside the operator station and is movable to a first position and to a second position. The seat is configured to seat an operator and facilitate operator accessibility to the one or more controls to manipulate the work implement. Further, the controller is configured to move the seat to the first position based on a first signal, and move the seat to the second position based on a second signal.

In yet another aspect the disclosure is directed to a method for operating a machine. The machine includes an operator station. The method includes moving, by a controller, a seat of the operator station to a first position based on a first signal. The method also includes moving, by the controller, the seat of the operator station to a second position based on a second signal.

DETAILED DESCRIPTION

Figure 1:
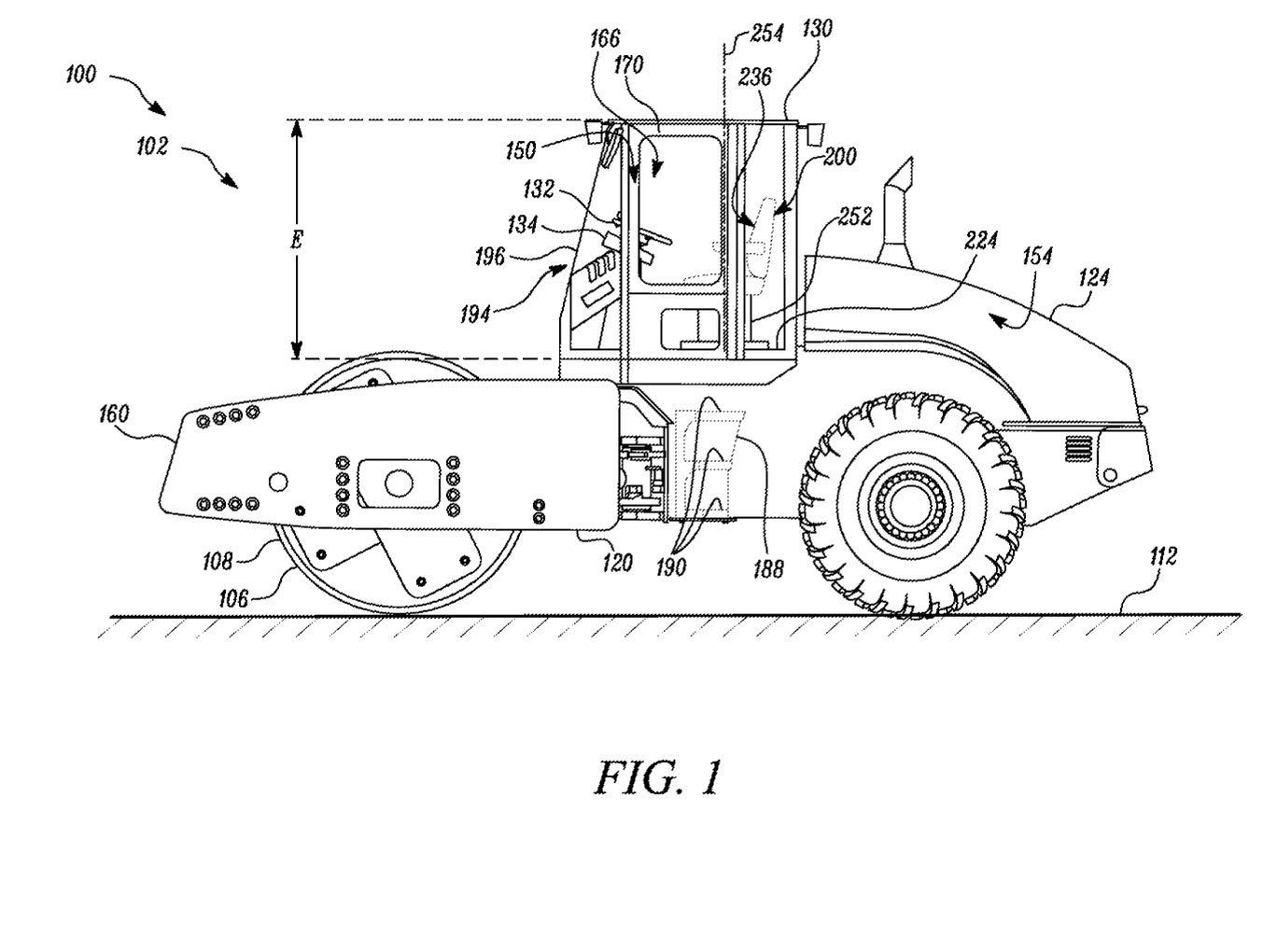
FIG. 1 is an exemplary machine including a work implement and an operator station, in accordance with an embodiment of the present disclosure.

Referring to FIG. 1, a machine 100 is shown, and as depicted, may be a compactor 102. The machine 100 may include a work implement 106, such as a roller drum 108, that may roll over and compact an underlying work surface 112. The work surface 112 may include asphalt, soil, etc. The machine 100 may include a frame 120 that may support various components and systems of the machine 100. For example, the work implement 106 may be coupled to and be supported by the frame 120. The machine 100 may also include a power compartment 124 that may house a power source (not shown), such as an internal combustion engine, to power the machine's movement and the functions associated with the operation of the work implement 106. Although the machine 100 is shown to be a compactor 102, aspects of the present disclosure may be applicable to several other machines, such as earthmoving machines, paving machines, construction machines, mining machines, rotary mixers, cold planers, and the like.

Referring to FIGS. 1 to 7, the machine 100 may include an operator station 130. The operator station 130 may house one or more devices, such as a steering wheel 132 to steer the machine 100 (see FIG. 2), as shown. The operator station 130 may also house various other input devices and controls, such as a control lever 138 (including joysticks) (not shown), a control panel 134, and a touchscreen 136, that may be used to manipulate the work implement 106, and also to control various duties set for the machine 100. The operator station 130 may include multiple electrical connections, fluid lines, etc., (not shown) associated with such input devices and controls. The operator station 130 may include a first lateral side 150 and a second lateral side 152. The second lateral side 152 may be laterally opposite to the first lateral side 150. The first lateral side 150 may be disposed on the same side as that of a right-hand side 154 of the machine 100 (when viewed from a front end 160 of the machine 100), while the second lateral side 152 may be disposed on the same side as that of a left-hand side 156 of the machine 100 (when viewed from the front end 160 of the machine 100).

Referring to FIGS. 2 to 5, the operator station 130 may include a first aperture 166, and a second aperture 168. The operator station 130 may include a first door 170, disposed on the first lateral side 150, to close/open the first aperture 166. Similarly, the operator station 130 may include a second door 172, disposed on the second lateral side 152, to close/open the second aperture 168. An opening of the first door 170 facilitates accessibility (to an operator) into the operator station 130 through the first aperture 166 from the first lateral side 150, while an opening of the second door 172 facilitates accessibility (to an operator) into the operator station 130 through the second aperture 168 from the second lateral side 152. In a closed state of the first door 170, the first door 170 may abut and rest against a first edge 176 (of the machine 100) defined around the first aperture 166, while in an open state of the first door 170 at least a portion of the first door 170 may be pivotably moved away from the first edge 176. Similarly, in a closed state of the second door 172, the second door 172 may abut and rest against a second edge 178 defined around the second aperture 168, while in an open state of the second door 172, at least a portion of the second door 172 may be pivotably moved away from the second edge 178.

Further, the operator station 130 may include a step assembly 188 adjacent to the first door 170 that may help an operator to climb into the operator station 130 from the first lateral side 150. For example, the step assembly 188 may include one or more steps 190 (best shown in FIG. 1) that may be serially arranged to help an operator to climb into the operator station 130. A similar step assembly 192 (see FIG. 2) may be contemplated adjacent to the second door 172 (see FIG. 2), as well. Also, the operator station 130 may include a forward glass area 194 (including a front windshield 196, for example) that provides visibility towards the front end 160 of the machine 100.

With continued reference to FIGS. 2 to 5, the operator station 130 will be discussed in further detail. The operator station 130 includes a seat 200, a controller 202, a first device 206, and a second device 208.

The seat 200 may be disposed inside the operator station 130, and may allow an operator of the machine 100 to be seated and stationed within the operator station 130. While being seated on the seat 200, an operator may be able to readily access one or more of the aforementioned controls to manipulate the work implement 106, and/or to move the machine 100. The seat 200 may define an operator-occupiable portion 236 over which an operator may be seated for performing operations associated with the machine 100.

Figure 5:
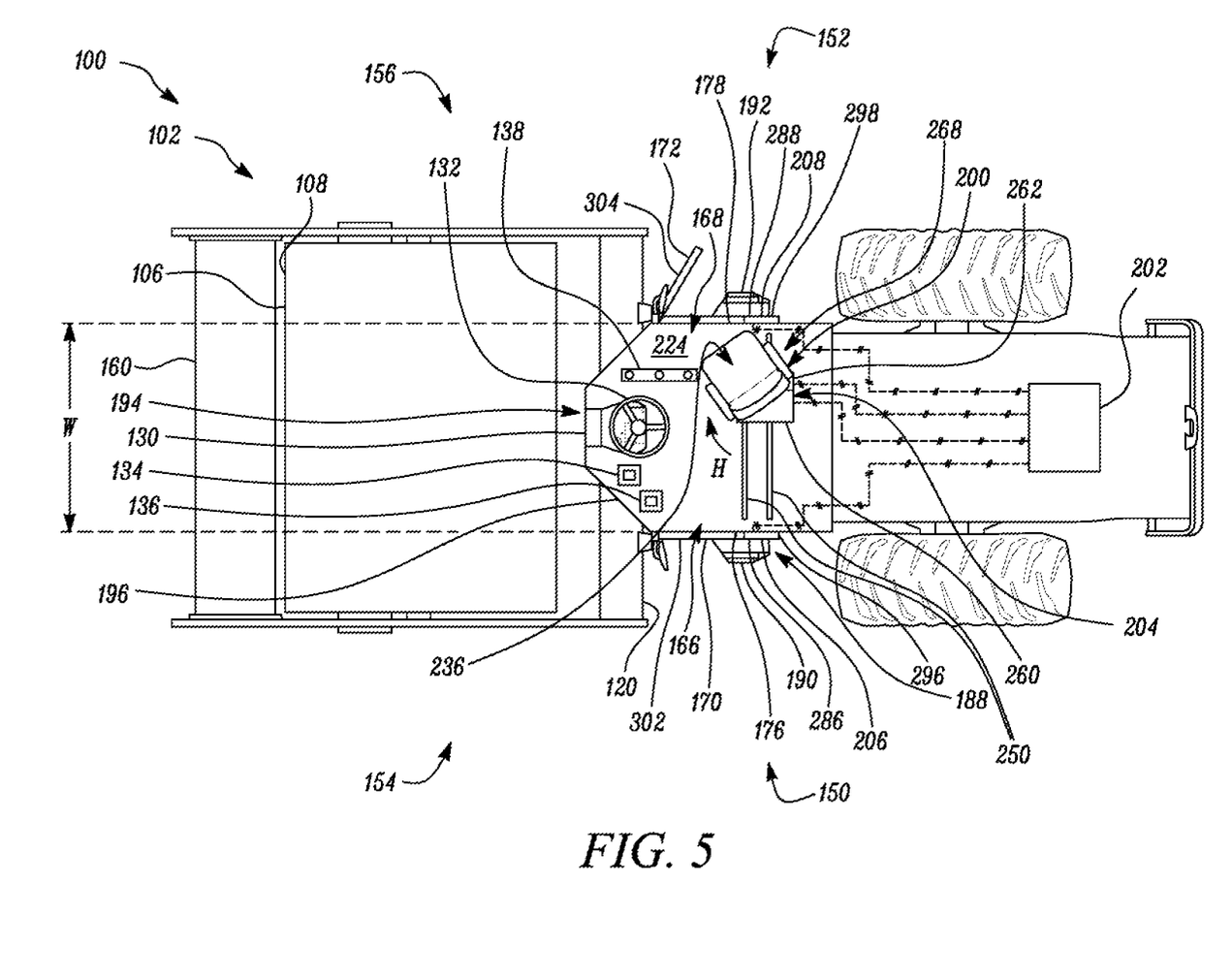

The seat 200 may be movable to multiple positions within the operator station 130. According to an embodiment, the seat 200 is movable to a first position 266 (FIG. 2) and to a second position 268 (FIG. 5). In the first position 266, the seat 200 (or the operator-occupiable portion 236) may be at least partially facing the first door 170, and, in the second position 268, the seat 200 (or the operator-occupiable portion 236) may be at least partially facing the second door 172. Moreover, in the first position 266, the seat 200 is closer to the first door 170 than to the second door 172, and, in the second position 268, the seat 200 is closer to the second door 172 than to the first door 170.

To facilitate movement of the seat 200, the operator station 130 may include a guide structure 250 and a rotary assembly 252. The guide structure 250 may include a pair of rails that may be disposed on the floor 224, extending along a width, W, (defined between the first lateral side 150 and the second lateral side 152). The guide structure 250 may facilitate a slidable movement of the seat 200 across the width, W. The rotary assembly 252 (see FIG. 1) may facilitate a rotatable movement of the seat 200 about an axis 254 (see FIG. 1) defined along an elevation, E (see FIG. 1), of the operator station 130.

In one example, the seat 200 may be moved to the first position 266 and the second position 268 by the controller 202. For example, the controller 202 may use each of the guide structure 250, the rotary assembly 252, and an actuation system 204 (FIG. 2), to facilitate said movement of the seat 200. To this end, the actuation system 204 may include a first actuation unit 260 and a second actuation unit 262. The first actuation unit 260 may be configured to power the slidable movement of the seat 200 across the width, W, by use of the guide structure 250, while the second actuation unit 262 may be configured to power a rotatable movement of the seat 200 about the axis 254 by use of the rotary assembly 252.

In one example, the seat 200 may be moved to the first position 266 based on a first signal received by the controller 202, and, similarly, the seat 200 may be moved to the second position 268 based on a second signal received by the controller 202. The forthcoming description discusses certain exemplary details pertaining to the generation of the first signal and the second signal, and a usage of the first signal and the second signal by the controller 202 to move the seat 200 to the first position 266 and the second position 268.

The first device 206 may be configured to generate the first signal, while the second device 208 may be configured to generate a second signal. Aspects of the present disclosure are discussed so as to cover two possible options for each of the first device 206 and the second device 208. According to a first option, the first device 206 and the second device 208 may respectively include a first sensor 286 and a second sensor 288, while according to a second option, the first device 206 and the second device 208 may respectively include a first switch 296 and a second switch 298.

In the case of the first sensor 286 and the second sensor 288, both the first sensor 286 and the second sensor 288 may be configured to respectively detect an opening of the first door 170 and the second door 172. In one example, both the first sensor 286 and the second sensor 288 may include proximity sensors. In such a case, according to an exemplary scenario, the first sensor 286 may be configured to detect an increase in distance between the first door 170 and any section of the machine 100 (such as the first edge 176), during an opening of the first door 170. Based on the detection of the increase in distance, the first sensor 286 may generate a first signal indicating an opening of the first door 170. Similarly, the second sensor 288 may be configured to detect an increase in distance between the second door 172 and any section of the machine 100 (such as the second edge 178), during an opening of the second door 172. Based on the detection of the increase of distance, the second sensor 288 may generate a second signal indicating an opening of the second door 172.

In another example, both the first sensor 286 and the second sensor 288 may include pressure sensors. In such a case, according to an exemplary scenario, the first sensor 286 may be able to detect a change (or decrease) in a pressure of engagement between the first door 170 and the first edge 176, during an opening of the first door 170. Based on the detection of the change (or decrease) in pressure of engagement, the first sensor 286 may generate a first signal indicating an opening of the first door 170. Similarly, the second sensor 288 may be configured to detect a change (or decrease) in a pressure of engagement between the second door 172 and the second edge 178, during an opening of the second door 172. Based on the detection of the change (or decrease) in pressure of engagement, the second sensor 288 may generate a second signal indicating an opening of the second door 172.

The first sensor 286 and the second sensor 288 may include a variety of other sensor types, such as optical sensors, that are configured to detect the door openings. Such sensors types, and the ones discussed above, may be applied either singularly, or in combination with each other, to detect the door openings. Moreover, sensor types disclosed herein need to be seen as being exemplary.

In the case of the first switch 296 and the second switch 298, both the first switch 296 and the second switch 298 may be disposed at an external surface of the machine 100, so as to be readily accessible for manual operation and activation by an operator of the machine 100, from an outside of the machine 100. For example, when the operator activates the first switch 296, the first signal is generated by the first switch 296, and when the operator activates the second switch 298, the second signal is generated by the second switch 298. For example, the first switch 296 may be disposed at an outer surface 302 of the first door 170, or at the first edge 176, and, similarly, the second switch 298 may be disposed at an outer surface 304 of the second door 172, or at the second edge 178. In some embodiments, the first switch 296 may be positioned anywhere on the left-hand side 156 of the machine 100, while the second switch 298 may be positioned anywhere on the right-hand side 154 of the machine 100.

In some embodiments, the first switch 296 may be incorporated into the step assembly 188 of the operator station. For example, at least one of the steps 190 (e.g., a step 190) of the step assembly 188 may include the first switch 296 and, thus, may afford an opportunity to an operator of the machine 100 to either use the step 190 to solely step-on and access the operator station 130, or to also use the step 190 to activate the first switch 296 and accordingly generate the first signal. As an example, the first switch 296 incorporated into the step 190, may be manually operable and may be actuatable by an operator's foot. In another example, the first switch 296 incorporated into the step 190, may facilitate a closure of an electrical contact to generate the first signal when a weight (of an operator) is exerted upon the step 190. In some further examples, the first switch 296 may be incorporated into the first door 170's handle (not shown) that may be held and used by an operator to open the first door 170. Discussions and embodiments for the second switch 298 vis-à-vis the second door 172 may remain similar to the discussions and embodiments for the first switch 296 vis-à-vis the first door 170 noted above. Additionally, the second switch 298 may be incorporated into the step assembly 192, and/or into the second door 172's handle (not shown) in a similar manner as the first switch 296 may be incorporated into the step assembly 188, and/or into the first door 170's handle.

A combination involving one of the first device 206 or the second device 208 to include a switch and the other of the first device 206 and the second device 208 to include a sensor may be contemplated. For example, the first device 206 may include the first sensor 286, while the second device 208 may include the second switch 298. Conversely, the first device 206 may include the first switch 296, while the second device 208 may include the second sensor 288.

In some embodiments, the first device 206 may include both the first sensor 286 and the first switch 296, and, similarly, the second device 208 may include both the second sensor 288 and the second switch 298.

The controller 202 may be communicably coupled (for example, by a physical link or a wireless link) to both the first device 206 and the second device 208, and to each of the first actuation unit 260 and the second actuation unit 262 of the actuation system 204. The controller 202 may be configured to receive the first signal from first device 206 (i.e., from the first sensor 286 and/or the first switch 296) and the second signal from the second device 208 (i.e., from the second sensor 288 and/or the second switch 298). In case the sensors 286, 288 were respectively applied as part of the devices 206, 208, the controller 202 may receive the signals from the sensors 286, 288 respectively based on the opening of the doors 170, 172. In case the switches 296, 298 were respectively applied as part of the devices 206, 208, the controller 202 may respectively receive the signals from the switches 296, 298 based on operator activation of the switches 296, 298.

For example, if the signal received by controller 202 were the first signal, the controller 202 may instruct the actuation system 204 (i.e., both the first actuation unit 260 and the second actuation unit 262) to power the movement of the seat 200 to the first position 266. In a similar example, if the signal received by the controller 202 were the second signal, the controller 202 may instruct the actuation system 204 (i.e., both the first actuation unit 260 and the second actuation unit 262) to power the movement of the seat 200 to the second position 268.

According to the embodiment depicted in FIGS. 2 to 5, an exemplary sequence of movement of the seat 200, facilitated by the controller 202, is depicted. The sequence of the movement of the seat 200 as shown in FIGS. 2 to 5 depict exemplary stages involved with a movement of the seat 200 from the first position 266 all the way to the second position 268. During the movement from the first position 266 to the second position 268, the seat 200 may execute both a rotatable movement and a slidable movement. As shown, in FIG. 2 (i.e., in the first position 266), the seat 200 (i.e., the operator-occupiable portion 236) is at least partially facing the first door 170—in FIG. 3, the seat 200 (i.e., the operator-occupiable portion 236) is moved by the controller 202 to face the front end 160 of the machine 100, but is closer to the first door 170 than to the second door 172—in FIG. 4, the seat 200 is moved by the controller 202 to be closer to the second door 172 than to the first door 170, but the operator-occupiable portion 236 remains oriented towards the front end 160 of the machine 100—in FIG. 5, (i.e., in the second position 268), the seat 200 (i.e., the operator-occupiable portion 236) is moved by the controller 202 to at least partially face the second door 172. A discussion related to a stepwise movement of the seat 200 from the first position 266 to the second position 268 is set out later in the description.

In some embodiments, the controller 202 may be connected to the machine's electronic control module (ECM) (not shown), such as a safety module or a dynamics module, or may be configured as a stand-alone entity. Optionally, the controller 202 may be integral and be one and the same as the ECM. The controller 202 may include a set of volatile memory units such as a random-access memory (RAM)/a read-only memory (ROM), which include associated input and output buses. More particularly, the controller 202 may be envisioned as an application-specific integrated circuit, or other logic devices, which provide controller functionality, and such devices being known to those with ordinary skill in the art. Exemplary arrangements of the controller 202 may include the controller 202's accommodation within certain machine panels or portions from where the controller 202 may remain accessible for ease of use, service, and repairs.

Figure 6:
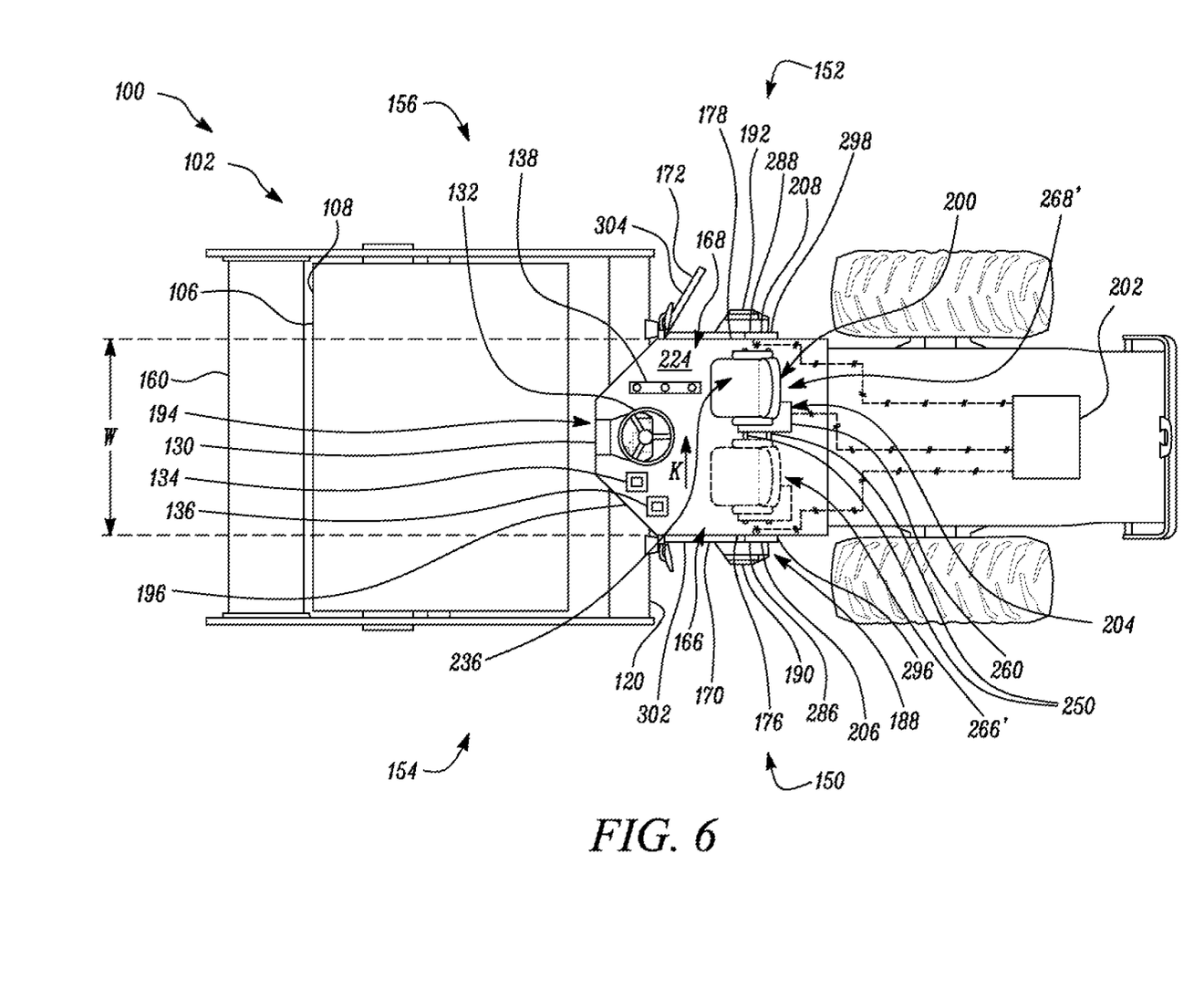
FIG. 6 is a view depicting another exemplary movement of the seat of operator station, in accordance with another embodiment of the present disclosure.
Figure 7:
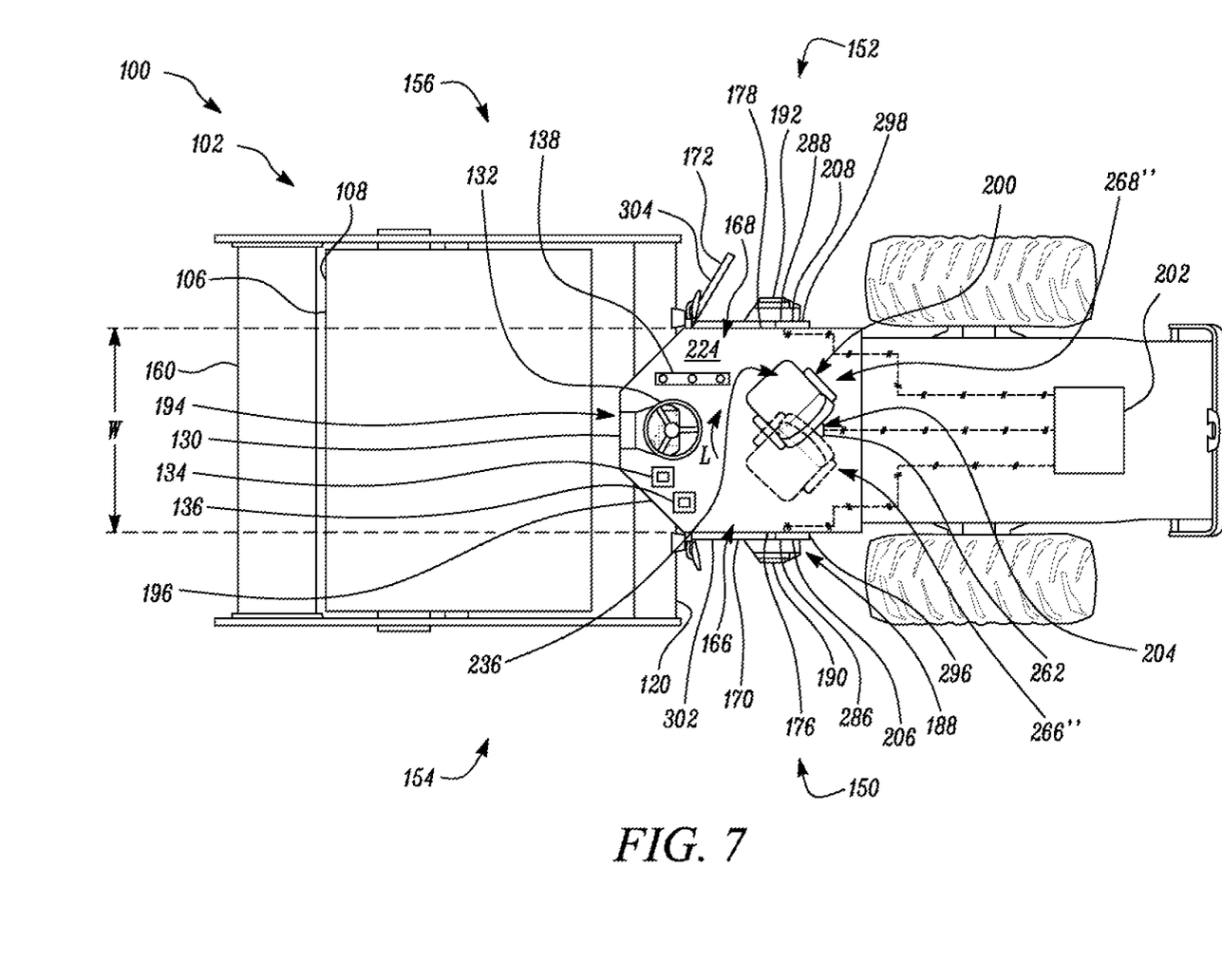
FIG. 7 is a view depicting yet another exemplary movement of the seat, in accordance with yet another embodiment of the present disclosure.

Referring to FIGS. 6 and 7, some exemplary embodiments of the operator station 130 are discussed. These embodiments relate to certain variations in an internal layout of the operator station 130 and a movement of the seat 200. For example, with reference to FIG. 6, a first embodiment of the operator station 130 (referred as operator station 130') is discussed, and with reference to FIG. 7, a second embodiment of the operator station 130 (referred to as operator station 130") is discussed. It may be noted that these embodiments, depicting variations in an internal layout of the operator station 130 and a movement of the seat 200, are purely exemplary, and need not be seen as limiting the aspects of the present disclosure in any way. Parts or elements common between the operator stations 130, 130', 130" have been annotated with the same reference numerals throughout the FIGS. 1 to 7.

Referring to FIG. 6, an exemplary movement of the seat 200, from a first position 266' to a second position 268', is discussed in conjunction with the operator station 130'. While the operator station 130', as depicted in FIG. 6, may include each of the elements discussed for the operator station 130 (see common annotations marked against the same elements), the rotary assembly 252 (see FIG. 1) and the second actuation unit 262 may be omitted in the operator station 130'. In such a case, a movement of the seat 200 to the first position 266' and to the second position 268' may correspond to the seat 200 being slidable to the first position 266' and to the second position 268'. In such a configuration, the first position 266' may be considered as the position where the seat 200 may be closer to the first door 170 than to the second door 172, and the operator-occupiable portion 236 may be facing the front end 160 of the machine 100, while, the second position 268' may be considered as the position where the seat 200 may be closer to the second door 172 than to the first door 170, and the operator-occupiable portion 236 may remain facing towards the front end 160 of the machine 100. According to the embodiment depicted in FIG. 6, no rotatable movement of the seat 200 may be possible. Accordingly, upon the receipt of the first signal from the first device 206, the controller 202 may be configured to move the seat 200 to the first position 266', and upon the receipt of the second signal, the controller 202 may be configured to move the seat 200 to the second position 268'.

Referring to FIG. 7, yet another exemplary movement of the seat 200, from a first position 266" to a second position 268", is discussed in conjunction with the operator station 130". While the operator station 130" as depicted in FIG. 7 may include each of the elements discussed for the operator station 130, 130' (see common annotations marked against the same elements), the guide structure 250 and the first actuation unit 260 may be omitted in the operator station 130". In such a case, a movement of the seat 200 to the first position 266 and to the second position 268 may correspond to the seat 200 being rotatable to the first position 266" and to the second position 268". In such a configuration, the first position 266" may be considered as the position where the seat 200 may be closer to the first door 170 than to the second door 172, and the seat 200 (i.e., the operator-occupiable portion 236) is at least partially facing the first door 170, while, the second position 268" may be considered as the position where the seat 200 may be closer to the second door 172 than to the first door 170, and the seat 200 (i.e., the operator-occupiable portion 236) is at least partially facing the second door 172. According to the embodiment depicted in FIG. 7, no slidable movement of the seat 200 may be possible. Accordingly, upon the receipt of the first signal from the first device 206, the controller 202 may be configured to move the seat 200 to the first position 266", and upon the receipt of the second signal, the controller 202 is configured to move the seat 200 to the second position 268".

INDUSTRIAL APPLICABILITY

Figure 2:
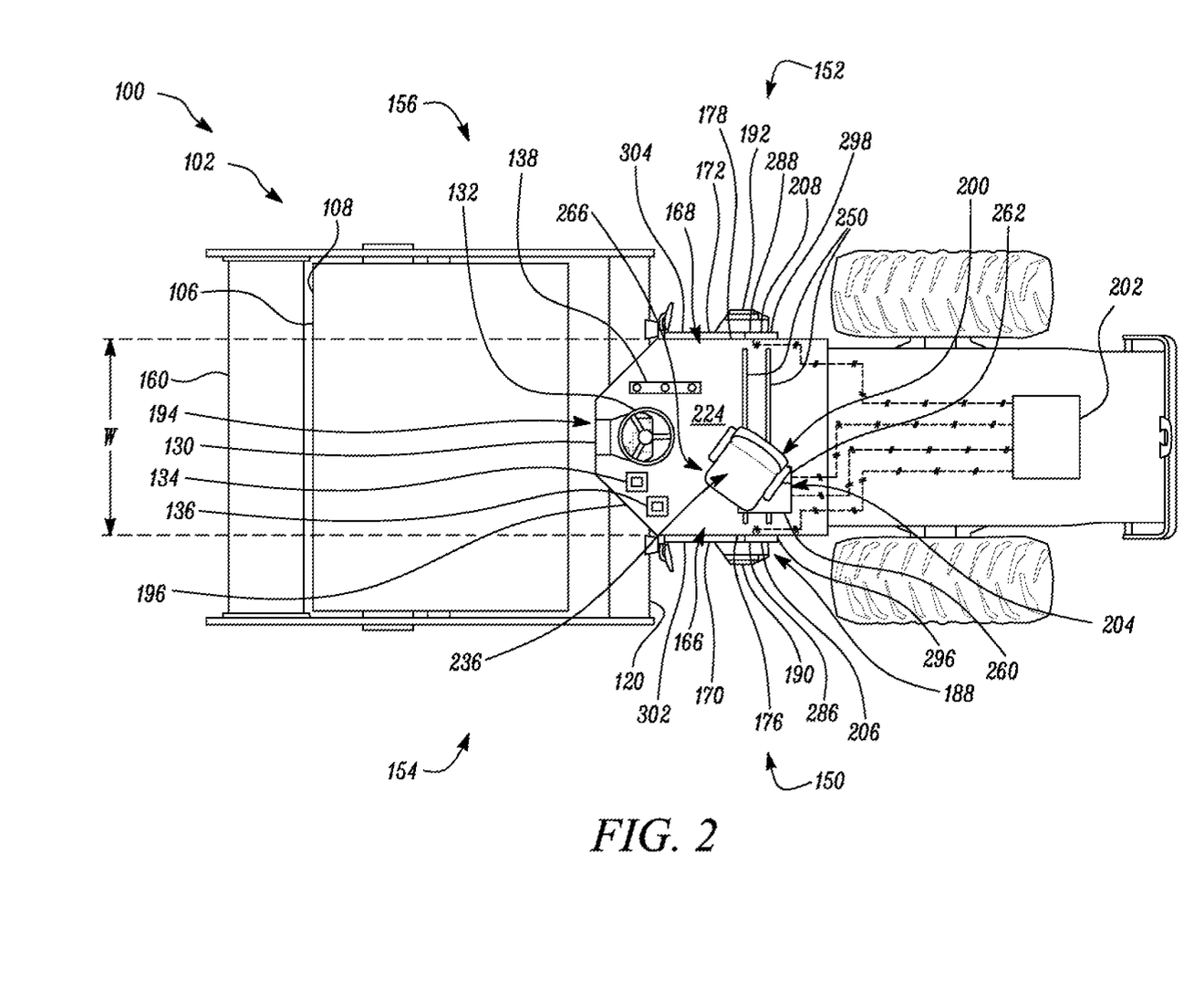
FIGS. 2 to 5 are various views of the machine depicting different exemplary stages involved with a movement of a seat of the operator station of the machine, in accordance with an embodiment of the present disclosure.

During operation (i.e., during machine movement), and with reference to FIGS. 2 to 5, the seat 200 may be set at an intermediate position (i.e., between the first position 266 and the second position 268), and in which position, the seat 200 may directly face the steering wheel 132. In the intermediate position, the steering wheel 132 (and various other controls, such as the touchscreen 136, control lever 138, etc.) of the operator station 130 may fall under direct access to an operator. If, at any point, the operator needs to exit the operator station 130, for example, at the end of a work shift, or for other purposes, the operator may stop machine movement, and may choose to exit from the first door 170. In order to do so, the operator may move the seat 200 (e.g., manually) from the intermediate position to the first position 266 so as to move closer to the first door 170 and ease operator exit by using the first door 170. Having moved the seat 200 to the first position 266, the operator may access the first door 170, open the first door 170 from the inside of the operator station 130, and exit through the first aperture 166, closing the first door 170 behind. Pursuant to the operator's exit, the seat 200 may remain unmoved at the first position 266 (i.e., in which the seat 200 at least partially remains facing the first door 170) (FIG. 2).

If the operator (or a new operator) were to return to the machine 100 and were to use the first door 170 for entry into the operator station 130, the operator may open the first door 170 to find the seat 200 unmoved in the first position 266, thus easing operator entry into the operator station 130 by use of the first door 170. However, if the operator were to return to the machine 100 and were to use the second door 172 for entry into the operator station 130, one or more aspects of the present disclosure may help the seat 200 move towards the second door 172, helping the operator enter into the operator station 130.

For example, during an entry attempted by use of the second door 172, the operator may reach out to the second door 172 from the outside to open the second door 172 and enter the operator station 130. As soon as the operator opens the second door 172, and if the second sensor 288 were used as the second device 208, the second sensor 288 may generate the second signal indicating the opening of the second door 172. As a result, the controller 202 may receive the second signal and may determine that the second door 172 is opened. Likewise, if the second switch 298 were used as the second device 208, the operator may activate the second switch 298 (in possible conjunction with the opening of the second door 172) to generate the second signal. It may be understood that the operator may activate the second switch 298 to generate the second signal either before, or after, or at the same time, of the opening of the second door 172, depending upon personal discretion. In effect, the controller 202 determines the opening of the second door 172 based on the second signal.

Figure 3:
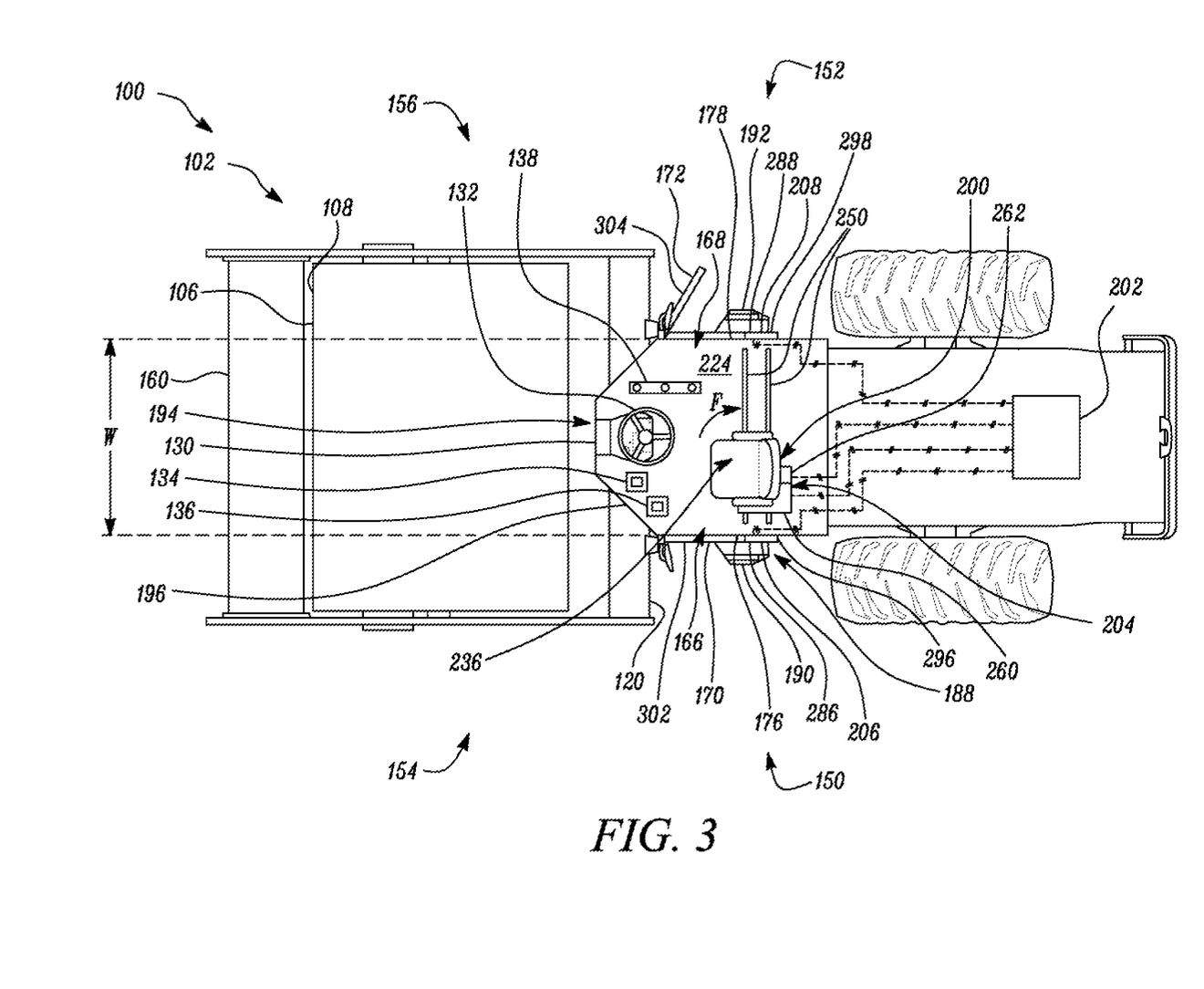
Figure 4:
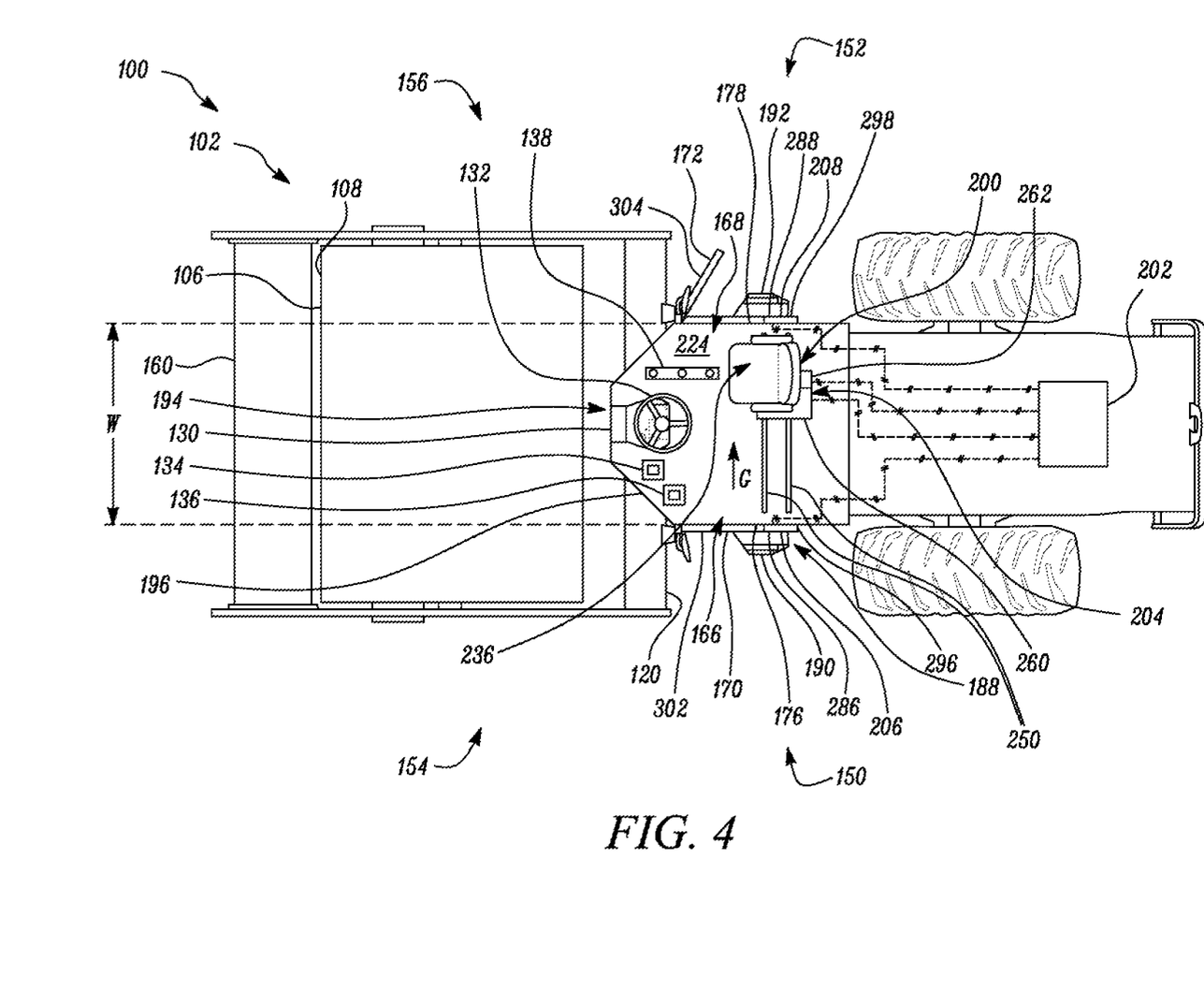

Upon the determination of the opening of the second door 172, the controller 202 instructs the second actuation unit 262 to move (i.e., to rotate) (arrow, F, FIG. 3) the seat 200 from the first position 266 to assume a position where the operator-occupiable portion 236 of the seat 200 is rotated away from the first position 266 and faces the front end 160 of the machine 100 (FIG. 3). Thereafter, the controller 202 instructs the first actuation unit 260 to move (i.e. to slide) (arrow. G. FIG. 4) the seat 200 towards the second door 172 while remaining oriented towards the front end 160 of the machine 100 (FIG. 4). Next, the controller 202 instructs the second actuation unit 262 to move (i.e., to rotate) (arrow, H, FIG. 5) the seat 200 away from facing the front end 160 of the machine 100 to the second position 268 (FIG. 5). In the second position 268 (FIG. 5) the operator-occupiable portion 236 of the seat 200 is at least partially facing the second door 172. With the operator-occupiable portion 236 of the seat 200 now at the second position 268 and at least partially facing the second door 172, it becomes easier for the operator to enter the operator station 130 through the second aperture 168 by use of the second door 172.

Conversely, if the operator were to use the second door 172 for exit and the first door 170 for entry, and if the seat 200 were at the second position 268 during the entry by use of the first door 170, a correspondence and working between the first device 206 and the controller 202 may be contemplated to remain similar to the correspondence and working discussed between the second device 208 and the controller 202 above, so as to move the seat 200 to the first position 266. Further, in some embodiments, if the operator exits the operator station 130, leaving the seat 200 at the intermediate position, the controller 202 may still instruct the actuation system 204 (i.e., first actuation unit 260 and the second actuation unit 262) to move (i.e., to slide and rotate) accordingly, so as to reach to any of the first position 266 or the second position 268 (depending upon which of the first door 170 or the second door 172 is being used by the operator for entry into the operator station 130).

In some embodiments, if one of the first door 170 or the second door 172 is being used for entry into the operator station 130, the controller 202 may first determine whether the other of the first door 170 or the second door 172 is closed and may facilitate movement of the seat 200 only if it is determined that the other of the first door 170 or the second door 172 is closed. In some embodiments, the controller 202 may determine if an operator is already in occupation of the operator-occupiable portion 236 of the seat 200 (for example, by detecting a weight on the seat 200 by suitable sensors), and accordingly may refrain from moving the seat 200 if any of the first door 170 and the second door 172 is opened by an operator.

Further, with reference to the embodiment disclosed in FIG. 6, the controller 202 may detect the opening of the second door 172 by a similar strategy as discussed above and may move (i.e., to slide) (see arrow, K) the seat 200 (by instructing the first actuation unit 260) to the second position 268' (from the first position 266') so as to facilitate operator entry into the operator station 130' by use of the second door 172. Similarly, with reference to the embodiment disclosed in FIG. 7, the controller 202 may detect the opening of the second door 172 by a similar strategy as discussed above and may move (i.e., to rotate) (see arrow, L) the seat 200 (by instructing the second actuation unit 262) to the second position 268" (from the first position 266") to facilitate operator entry into the operator station 130" by use of the second door 172.

With use of the seat movements as disclosed in each of the embodiments of FIGS. 2 to 5, FIG. 6, and FIG. 7, an operator of the machine 100 may find it easier and less cumbersome to enter and be seated within the operator station 130, 130', 130", and any inadvertent damage to the consoles (including fluid/electrical lines associated with the control lever 138, control panel 134, touchscreen 136, etc.) inside the operator station 130, 130', 130" may be prevented. Moreover, the provision to move the seat 200 towards any of the first door 170 or the second door 172, used for entry by the operator, keeps the operator free from undue stress and helps attain an operator centric environment within the machine 100, in turn improving operator comfort, easing machine ingress, and helping the operator achieve higher productivity.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. An operator station for a machine, the operator station comprising:
    a first door and a second door to provide access to the operator station;
    a seat disposed inside the operator station and movable to a first position and to a second position;
    a controller configured to
        control automatic movement of the seat to the first position based on a first signal, and
        control automatic movement of the seat to the second position based on a second signal;
    a first device communicably coupled to the controller and configured to generate the first signal; and
    a second device communicably coupled to the controller and configured to generate the second signal,
    wherein the controller is configured to
        determine whether either of the first or second signals is generated,
        determine whether the operator is in the seat, and
        disable the automatic movement of the seat when the controller determines that either the first signal or the second signal is generated and that the operator is in the seat.

2. The operator station of claim 1, wherein the first device includes a first sensor configured to detect an opening of the first door and generate the first signal, and the second device includes a second sensor configured to detect an opening of the second door and generate the second signal.

3. The operator station of claim 1, wherein the first device includes a first switch, and the second device includes a second switch, each of the first switch and the second switch being manually operable by an operator to respectively generate the first signal and the second signal.

4. The operator station of claim 1 further including a first lateral side and a second lateral side opposite to the first lateral side, the first door facilitating accessibility to the operator station from the first lateral side, and the second door facilitating accessibility to the operator station from the second lateral side.

5. The operator station of claim 1, wherein the seat being movable to the first position and to the second position corresponds to the seat being slidable to the first position and to the second position.

6. The operator station of claim 1, wherein, in the first position, the seat is closer to the first door than to the second door, and, in the second position, the seat is closer to the second door than to the first door.

7. The operator station of claim 1, wherein the seat being movable to the first position and to the second position corresponds to the seat being rotatable to the first position and to the second position.

8. The operator station of claim 1, wherein, in the first position, the seat is at least partially facing the first door, and, in the second position, the seat is at least partially facing the second door.

9. A machine, comprising:
a work implement;
an operator station including one or more controls configured to manipulate the work implement, the operator station including:
a first door and a second door to provide access to the operator station;
a seat disposed inside the operator station and movable to a first position and to a second position, the seat configured to seat an operator and facilitate operator accessibility to the one or more controls to manipulate the work implement;
a controller configured to
control automatic movement of the seat to the first position based on a first signal, and
control automatic movement of the seat to the second position based on a second signal;
a first device communicably coupled to the controller and configured to generate the first signal; and
a second device communicably coupled to the controller and configured to generate the second signal,
wherein the controller is configured to
determine whether either of the first or second signals is generated,
determine whether the operator is in the seat, and
disable the automatic movement of the seat when the controller determines that either the first signal or the second signal is generated and that the operator is in the seat.

10. The machine of claim 9, wherein the first device includes a first sensor configured to detect an opening of the first door and generate the first signal, and the second device includes a second sensor configured to detect an opening of the second door and generate the second signal.

11. The machine of claim 9, wherein the first device includes a first switch, and the second device includes a second switch, each of the first switch and the second switch being manually operable by an operator to respectively generate the first signal and the second signal.

12. The machine of claim 9, wherein the seat being movable to the first position and to the second position corresponds to the seat being slidable to the first position and to the second position.

13. The machine of claim 9, wherein, in the first position, the seat is closer to the first door than to the second door, and, in the second position, the seat is closer to the second door than to the first door.

14. The machine of claim 9, wherein the seat being movable to the first position and to the second position corresponds to the seat being rotatable to the first position and to the second position.

15. The machine of claim 9, wherein, in the first position, the seat is at least partially facing the first door, and, in the second position, the seat is at least partially facing the second door.

16. A method for operating a machine, the machine including an operator station, the method comprising:
moving, using a controller, a seat of the operator station to a first position based on a first signal generated by a first device communicably coupled to the controller;
moving, using the controller, the seat of the operator station to a second position based on a second signal generated by a second device communicably coupled to the controller;
determining, using the controller, whether either of the first or second signals is generated;
determining, using the controller, whether an operator is in the seat; and
disabling, using the controller, the movement of the seat when said determining determines that either the first signal or the second signal is generated and that the operator is in the seat.

17. The method of claim 16, further including:
detecting, by a first sensor as said first device, an opening of a first door of the operator station, wherein the first sensor generates the first signal upon the opening of the first door; and
detecting, by a second sensor as said second device, an opening of a second door of the operator station, wherein the second sensor generates the second signal upon the opening of the second door.

18. The method of claim 16, further including:
receiving, by the controller, the first signal upon an activation of a first switch as said first device; and
receiving, by the controller, the second signal upon an activation of a second switch as said second device.

19. The operator station of claim 1, wherein the controller is configured to disable the automatic movement of the seat when the controller determines that both the first door and the second door are open.

20. The method of claim 16, further including:
determining, using the controller, whether both a first door and a second door of the operator station are open at a same time based on the first and second signals, respectively; and
disabling, using the controller, said moving the seat when said determining determines that both the first door and the second door are open at the same time.

* * * * *